US008393394B2

(12) United States Patent
Dusterhoft et al.

(10) Patent No.: US 8,393,394 B2
(45) Date of Patent: *Mar. 12, 2013

(54) METHODS FOR STRENGTHENING FRACTURES IN SUBTERRANEAN FORMATIONS

(75) Inventors: Ronald G. Dusterhoft, Katy, TX (US); Jimmie D. Weaver, Duncan, OK (US); Richard D. Rickman, Duncan, OK (US); Michael A. McCabe, Duncan, OK (US); Dwain King, Ennis, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/851,953

(22) Filed: Aug. 6, 2010

(65) Prior Publication Data
US 2011/0240292 A1    Oct. 6, 2011

Related U.S. Application Data

(63) Continuation-in-part of application No. 12/751,770, filed on Mar. 31, 2010, now Pat. No. 8,371,384, and a continuation-in-part of application No. 12/826,426, filed on Jun. 29, 2010, now Pat. No. 8,371,382.

(51) Int. Cl.
*E21B 33/13* (2006.01)
*E21B 43/02* (2006.01)

(52) U.S. Cl. .................... 166/300; 166/276; 166/293
(58) Field of Classification Search ................ None
See application file for complete search history.

(56) References Cited

U.S. PATENT DOCUMENTS

| | | | |
|---|---|---|---|
| 3,880,764 | A | 4/1975 | Donham |
| 4,366,071 | A | 12/1982 | McLaughlin et al. |
| 4,424,076 | A | 1/1984 | Reed |
| 4,974,678 | A | 12/1990 | Himes et al. |
| 5,097,094 | A | 3/1992 | Martin et al. |
| 2006/0073980 | A1 | 4/2006 | Brannon et al. |
| 2008/0093073 | A1 | 4/2008 | Bustos et al. |
| 2009/0114390 | A1 | 5/2009 | You |
| 2010/0224361 | A1 | 9/2010 | Pope et al. |
| 2011/0240291 | A1 | 10/2011 | Rickman et al. |
| 2011/0240296 | A1 | 10/2011 | Dusterhoft et al. |

FOREIGN PATENT DOCUMENTS

| | | |
|---|---|---|
| WO | WO 2008/0118242 A1 | 10/2008 |
| WO | WO 2009/0150402 A2 | 12/2009 |
| WO | WO 2009/0150402 A3 | 12/2009 |
| WO | WO 2010/0041033 A2 | 4/2010 |
| WO | WO 2010/0041033 A3 | 4/2010 |

OTHER PUBLICATIONS

International Search Report and Written Opinion for PCT/GB2011/000973 dated Sep. 29, 2011.
Wen et al., "The Effect of Proppant Embedment Upon the Long-Term Conductivity of Fractures," ScienceDirect, Journal of Petroleum Science and Engineering 55 (2007) 221-227.
International Search Report and Written Opinion for PCT/GB2011/000484 dated May 30, 2011.
Hemphill et al., Direct Strength Measurements of Shale Interaction with Drilling Fluids, Society of Petroleum Engineers, 2008 Abu Dhabi International Petroleum Exhibition and Conference held in Abu Dhabi, UAE, Nov. 3-6, 2008, SPE 117851.
Hemphill et al., Changing Shale Strengths With Invert Emulsion Drilling Fluids: Theory, Measurement, and Modeling, Society of Petroleum Engineers, 2009 SPE Latin American and Caribbean Petroleum Engineering Conference held in Cartagena, Colombia, May 31-Jun. 3, 2009, SPE 123013.
Hemphill et al., Changing the Safe Drilling Window with Invert Emulsion Drilling Fluids: Advanced Wellbore Stability Modeling Using Experimental Results, Society of Petroleum Engineers, CPS/SPE International Oil & Gas Conference and Exhibition in China held in Beijing, China, Jun. 8-10, 2010, SPE 132207.

*Primary Examiner* — Zakiya W Bates
(74) *Attorney, Agent, or Firm* — Robert A. Kent; McDermott Will & Emery LLP

(57) ABSTRACT

Of the many methods provided herein. one method comprises: providing at least a portion of a subterranean formation that comprises a shale; providing a plasticity modification fluid that comprises an aqueous fluid and an alkaline embrittlement modification agent; placing a pack completion assembly neighboring the portion of the subterranean formation; and embrittling at least a portion of the shale to form an embrittled shale portion.

20 Claims, 10 Drawing Sheets

Irregular hole within finely interbedded sand/shale reservoir

Borehole Breakout

Massive Sand

Interbedded Sand/Shale

METHODS FOR STRENGTHENING FRACTURES IN SUBTERRANEAN FORMATIONS

RELATED APPLICATIONS

This application is a continuation-in-part of U.S. patent application Ser. No. 12/751,770, filed on Mar. 31, 2010 now U.S. Pat. No. 8,371,384. Another related continuation-in-part also has been filed that is U.S. patent application Ser. No. 12/826,426, filed on Jun. 29, 2010 now U.S. Pat. No. 8,371,382.

BACKGROUND

The present invention relates to methods of treating a subterranean formation, and, at least in some embodiments, to methods of strengthening fractures in subterranean formations having low inherent permeability that comprise tight gas, shales, clays, and/or coal beds.

Subterranean formations comprising tight gas, shales, clays, and/or coal beds generally have a low permeability. As used herein, the term "tight gas" refers to gas found in sedimentary rock that is cemented together so that flow rates are relatively very low. As used herein, the term "shale" refers to a sedimentary rock formed from the consolidation of fine clay and silt materials into laminated, thin bedding planes. As used herein, the term "clay" refers to a rock that may be comprised of, inter alia, one or more types of clay, including, but not limited to kaolinite, montmorillonite/smectite, illite, chlorite, and any mixture thereof. The clay content of the formations may be a single species of a clay mineral or several species, including the mixed-layer types of clay. As used herein, "coal bed" refers to a rock formation that may be comprised of, inter alia, one or more types of coal, including, but not limited to, peat, lignite, sub-bituminous coal, bituminous coal, anthracite, and graphite. Traditionally, these unconventional formations have been viewed as having non-productive rock by the petroleum industry because they are "tight" and have low permeability. The term "permeability" as used herein refers to the ability, or measurement of a rock's ability, to transmit immiscible fluids, typically measured in darcies or millidarcies. Formations that transmit these fluids readily, such as sandstones, are described as permeable and tend to have many large, well-connected pores. Impermeable formations, such as shales and siltstones, tend to be finer grained or of a mixed grain size, with smaller, fewer, or less interconnected pores. If a single immiscible fluid is present in a rock, its relative permeability is 1.0. Calculation of relative permeability allows for comparison of the different abilities of fluids to flow in the presence of each other, since the presence of more than one fluid generally inhibits flow. The relative differences are often categorized as high permeability or low permeability relative to a permeability of 1.0. Also, they require specialized drilling and completion technologies. Recently, however, there have been a number of significant natural gas discoveries in such formations, which in this economic climate, have warranted production.

Fractures are the primary conduit for the production of oil and gas. In these applications, most of the effective porosity may be limited to the fracture network within the formation, but some gas may have also been trapped in the formation matrix, the various layers of rock, or in the bedding planes. To make these types of formations economical, fracturing/stimulation treatments often are advisable to connect the natural microfractures in the formation as well as create new fractures. Creating or enhancing the conductivity of the formation should increase the production of gas from the formation. In other words, the more surface area that can be exposed within the formation through fracturing the formation, the better the economics and efficiency will be on a given well.

Fracturing such formations is typically accomplished by using linear or crosslinked gels or fresh or salt water fluids comprising a friction reduction additive. These water type fracturing treatments are often referred to as "slick water fracs." In such treatments, often the primary objective is to create or connect a complex fracture network, sometimes called a dendritic network, so hydrocarbons may be transported from the reservoir to the well bore in economic quantities.

Problematic in these fractures and fracture networks is the closure/healing of these fractures and or partial or complete proppant embedment resulting from increased closure stress due to high draw down pressures during production as well as potential softening of the formation after exposure to the treatment fluids. Many shales and/or clays are reactive with fresh water, resulting in ion exchange and absorption of aqueous fluids leading to embrittlement of the rock in the formation. The term "embrittlement" and its derivatives as used herein refers to a process by which the properties of a material are changed through a chemical interaction such that a material that originally behaves in a ductile or plastic manner is transformed to a material that behaves in a more brittle manner. Additionally, such degradation may substantially decrease the stability of fractures in the formation, which may cause a decrease in the productivity of the well.

This degradation also leads to proppant embedment. Proppant embedment is believed to cause a reduction in fracture width and conductivity, and may be caused by a compression failure within the fracture. Unlike in well-consolidated formations, proppant embedment in these types of tight formations can be as high as several proppant-grain diameters, e.g., in weakly consolidated sandstones. FIG. 1 illustrates the proppant embedment phenomena. FIG. 2 is a computer screen image illustrating the phenomena. Proppant embedment can reduce fracture width from about 10% to about 60% or more, for example almost 100%, when there is a very low concentration of proppant in the fracture, with subsequent reduction in productivity from oil and gas wells. FIG. 3 illustrates a fracture having near 100% embedment. When this occurs, the pathway for hydrocarbons to the well bore may become obstructed, and production may be impaired.

Clays can swell, disperse, disintegrate or otherwise become disrupted in the presence of foreign aqueous fluids. The swelling or dispersion of clays can significantly reduce the permeability of a formation. The use of salts as formation control additives has not eliminated formation damage as a result of permeability reduction, but can reduce or minimize such damage. A clay which swells is not limited to expanding lattice-type clays but includes all those clays which can increase in bulk volume with or without dispersing, degrading, or otherwise becoming disrupted, when placed in contact with foreign aqueous solutions such as water, and certain brines. Certain clays can also disperse, degrade, or otherwise become disrupted without swelling in the presence of foreign aqueous solutions such as water, certain brines, and emulsions containing water or certain brines. Some clays, in the presence of foreign aqueous solutions, will expand and be disrupted to the extent that they become unconsolidated and produce particles which migrate into a borehole. Formations which consist largely of clay upon absorbing water in a confined space can develop pressures on the order of several thousands of pounds per square inch.

The clay materials defined above occur as minute, plate-like, tube-like and/or fiber-like particles having an extremely large surface area as compared to an equivalent quantity of a granular material such as sand. This combination of small size and large surface area results in a high surface energy with attendant unusual surface properties and extreme affinity for surface-active agents. The structure of some of these clays, for example, montmorillonite, can be pictured as a stack of sheet-like three-layer lattice units which are weakly bonded to each other and which are expanded in the "c" crystallographic direction by water or other substances which can penetrate between the sheets and separate them.

Moreover, the fine aggregate that composes shales and/or clays can pose problems if exposed to high stresses. For example, under high stress, shale can mechanically fail, resulting in the generation of fine clay materials that can be highly mobile in produced fluids. In situations where there is high pore pressure and very little permeability, when the system is exposed to a low pressure environment, the surrounding formation can almost fluidize solid. For example, it is believed that shale, when exposed to high stress and pore pressure conditions, can transform from a solid into a semi-liquid material causing it to intrude into a proppant pack. This can result in shale intrusion, well bore sloughing and large quantities of solids production, plugging screens or filling separators on the surface.

In some formations, the bonding between bedding plane layers may be weaker than the bonding between particles in a given layer. In such formations, the bedding plane may represent a weakness susceptible to mechanical failure or separation. To combat these problems, brines are often used that contain high ion concentration so that ion exchange will not occur and the reactivity of the shales and/or clays will be reduced. In extreme cases, oil-based fluids may be used to avoid exposing the shales and/or clays to aqueous fluids.

Sloughing of shale sections has been an on-going problem for the petroleum industry for years. This sloughing has generally been attributed to shear failure occurring in the immediate well bore region when a circular hole is drilled into a rock under a particular stress state. Such rock formations may comprise laminated sands and/or layered sand/shale sequences.

As illustrated in FIG. 14, even very thin shale sections imbedded into a productive formation can undergo mechanical failure and result in significant solids being released into the formation. The presence of exposed shale in either of such systems represents significant risk to failure in many sand control completions in high permeability reservoirs. More specifically, the shale, when exposed to production pressure conditions with draw-down pressure, can undergo shear failure resulting in the liberation of formation fines that can damage and plug gravel packs and screens in sand control completions.

In open hole completions in a producing oil or gas well, exposed shale sections in the open hole section will be exposed to the reduced pressures required to initiate the flow of the oil or gas into the well. Since the shale typically has low permeability, it tends to trap pressure, potentially creating an imbalance where higher pressured shale formations exist in close proximity to low pressured productive formations. The fact that the shale traps pore pressure and is exposed to low well bore pressures causes an increase in stress, similar to drilling with a lightweight drilling fluid. This can lead to shear failure and bore hole break outs and sloughing of solids into the well bore.

FIGS. 12 through 17 show image logs taken in a well where borehole breakout occurred in the shale section. Borehole breakouts are zones of failure of the borehole wall which form symmetrically at the azimuth of the least principal horizontal stress. The breakouts are frequently elongated in the direction of the borehole axis, and can be described by three parameters: orientation in the borehole, opening angle, and radial depth. Borehole breakouts can result in drill string damage, borehole collapse, sand production, or loss of mud.

The use of aqueous-based drilling fluids are thought to exacerbate this problem as such fluids are thought to lead to swelling of the shale, causing its mechanical strength to be reduced and its susceptibility to shear failure, borehole breakout, and sloughing to be significantly increased.

In a stand alone screen completion, the liberation of solids from mechanically failed shale portions in the well bore can result in significant plugging or erosion of the screens ultimately leading to a completion failure due to lost productivity or sand production. Shale intrusion or embedment has also been identified as a problem in "FracPac™" type completions where there can be a significant loss in effective fracture width due to the invasion of solids into the high permeability proppant pack. In gravel pack and FracPac completions (collectively referred to herein as "pack completions"), the shale is still exposed to the reduced production pressures, but is supported mechanically by the presence of gravel or proppant. In certain shale formations, however, mechanical failure can result in extreme embedment where the proppant or gravel grains are pushed into the surface of the shale resulting in a loss in permeability in the gravel pack or proppant pack. In extreme cases where there is high differential pressure in the shale, this can behave more like an intrusion of the failed shale into the proppant pack as shown in FIGS. 1 and 2, for example.

SUMMARY

The present invention relates to methods of treating a subterranean formation, and, at least in some embodiments, to methods of strengthening fractures in subterranean formations having low inherent permeability that comprise tight gas, shales, clays, and/or coal beds.

In one embodiment, the present invention provides a method comprising: providing at least a portion of a subterranean formation that comprises a shale; providing a plasticity modification fluid that comprises an aqueous fluid and an alkaline embrittlement modification agent; placing a pack completion assembly neighboring the portion of the subterranean formation; and embrittling at least a portion of the shale to form an embrittled shale portion.

In one embodiment, the present invention provides a method comprising: providing a subterranean formation that comprises a shale; providing a plasticity modification fluid comprising an embrittlement modification agent; placing the plasticity modification fluid into a subterranean formation so as to form an embrittled shale portion of the formation, wherein the embrittled shale portion has a retained hardness factor of at least 65% when tested using a Modified Brinell Hardness Test.

In one embodiment, the present invention provides a method comprising: providing a selected portion of a subterranean formation that comprises a shale and having a first Young's modulus; providing a plasticity modification fluid comprising an embrittlement modification agent; and placing the plasticity modification fluid into the subterranean formation so as to embrittle the shale to form an embrittled shale portion so that the embrittled shale portion has a second Young's modulus after treatment that is higher than the first Young's modulus.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
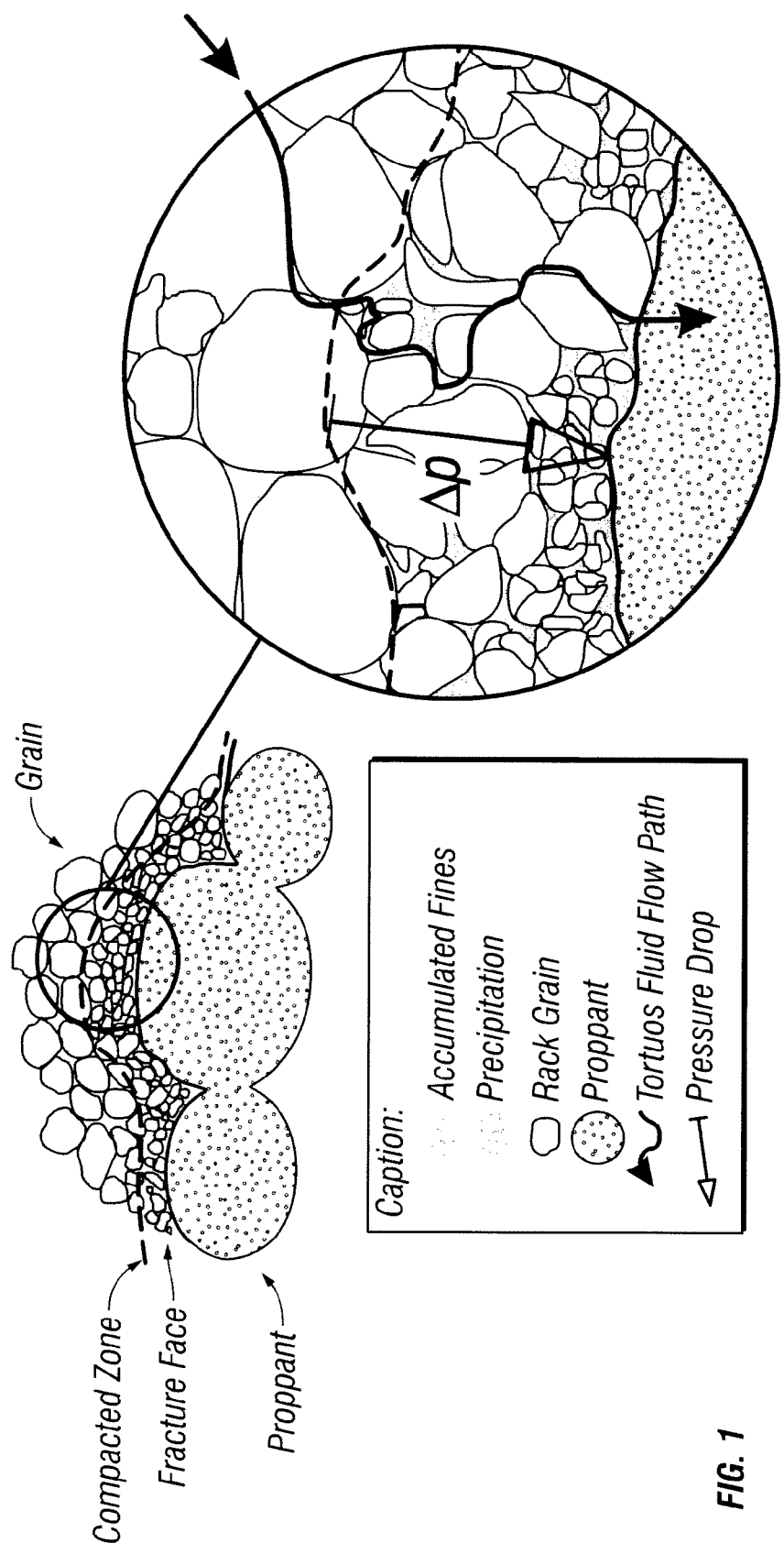
FIG. 1 illustrates a rock formation showing proppant embedment.
Figure 2:
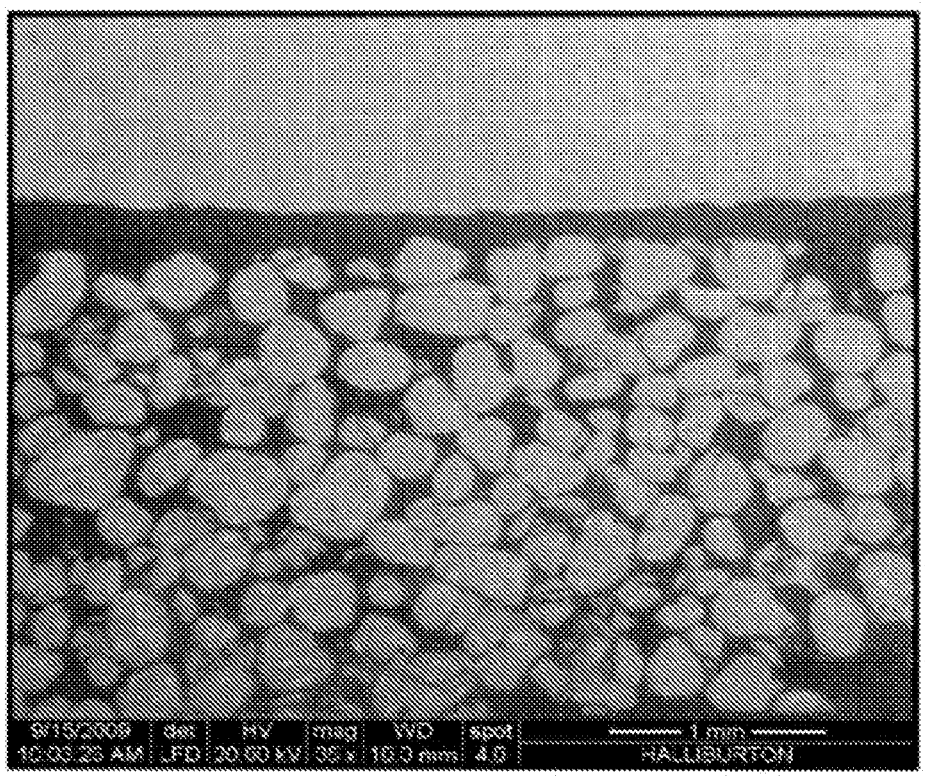
FIG. 2 illustrates proppant embedment in a fracture.
Figure 3:
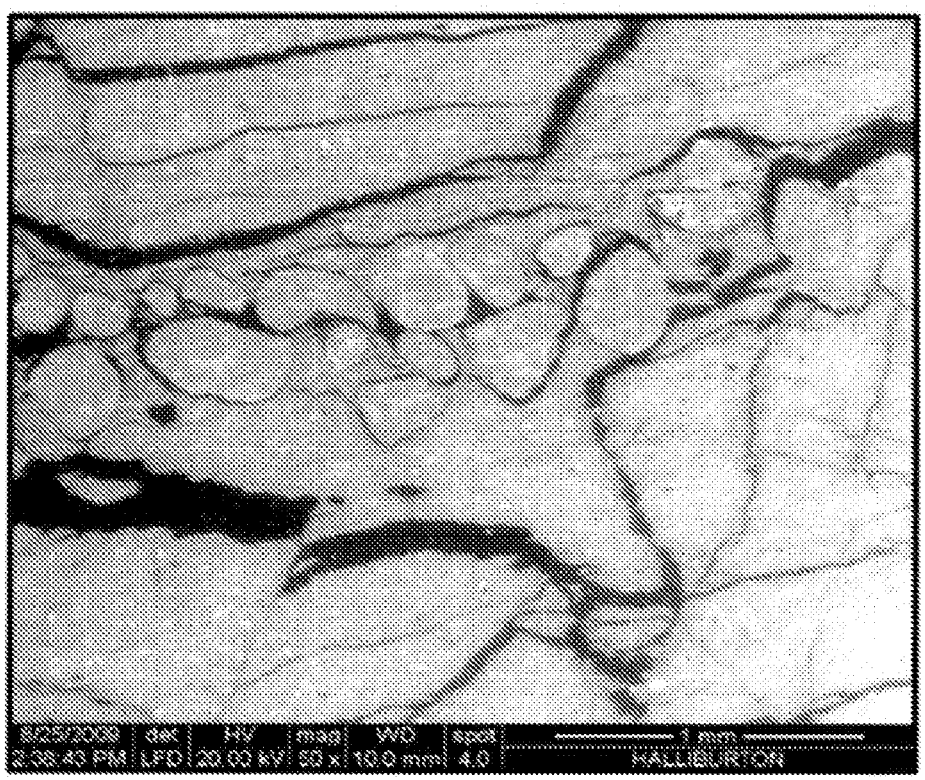
FIG. 3 illustrates a near 100% proppant embedment in a fracture.

The present invention relates to methods of treating a subterranean formation, and, at least in some embodiments, to methods of strengthening fractures in subterranean formations having low inherent permeability that comprise tight gas, shales, clays, and/or coal beds.

Of the many advantages of the present invention, only some of which are discussed or eluded to herein, one advantage is that these methods can minimize proppant embedment and fracture closure by modifying the surface of the fracture faces in the formations such that it increases or maintains its relative hardness after exposure to treating fluids. It is believed that this is achieved through a chemical alteration of the mechanical phenomena at the fracture face, which results in a prevention of the extrusion or intrusion of the rock surrounding the formation into the proppant pack in the fracture. This is believed to reduce proppant embedment, shale migration, and the like. Moreover, it is possible that the fractures in tight gas, shales, clays, and/or coal beds may be strengthened by use of the methods of the present invention, which may lead to increased productivity of a well in the formation, by embrittling the rock surrounding the fractures. Moreover, strengthening or hardening of the rock can be accomplished by the removal of trapped water within the grain structure of the rock. Removal of this water can result in a reduction in volume of the rock which essentially causes the increase in strength. Reducing the volume of the rock is one possible means of increasing the effective conductivity or permeability of micro fractures where the fluid leaks into. Additionally, the presence of cations may enhance this effect, and can be present either naturally in the formation or added to the formation with a treatment fluid. The methods of the present invention may be especially suitable for use in conjunction with water fracturing methods, such as slickwater fracs.

At least in some embodiments, the methods of the present invention are designed to chemically embrittle and strengthen the exposed shale so that it will have improved stability when exposed to production conditions. By preventing sloughing of shale in open hole completions, for example, and embrittling shale to minimize proppant embedment, long term completion reliability may be improved. The productive life of gravel pack and FracPac completions can also be improved in laminated reservoirs where shale is exposed to the completion.

As stated above, the term "embrittlement" and its derivatives as used herein is used to explain a process by which the properties of a material are changed through a chemical interaction such that a material that behaves in a ductile or plastic manner is transformed to a material that behaves in a more hard or brittle manner. This may be due to a favorable ion exchange and active transport. Embrittlement may be determined by examining the Young's modulus and the Poisson's ratio of the natural rock before treatment. If the rock has become embrittled, the Young's modulus should be higher and the Poisson's ratio should be lower as compared to the natural rock before treatment.

Young's modulus is the ratio of stress, which has units of pressure, to strain, which is dimensionless; therefore Young's modulus itself has units of pressure. The SI unit of modulus of elasticity (E, or less commonly Y) is the pascal (Pa or $N/m^2$); the practical units are megapascals (MPa or $N/mm^2$) or gigapascals (GPa or $kN/mm^2$). In United States customary units, it is expressed as pounds (force) per square inch (psi). Young's modulus, E, can be calculated by dividing the tensile stress by the tensile strain:

$$E \equiv \frac{\text{tensile stress}}{\text{tensile strain}} = \frac{\sigma}{\varepsilon} = \frac{F/A_0}{\Delta L/L_0} = \frac{FL_0}{A_0 \Delta L} \qquad \text{Equation 1}$$

Where:
E is the Young's modulus (modulus of elasticity);
F is the force applied to the object;
$A_0$ is the original cross-sectional area through which the force is applied;
$\Delta L$ is the amount by which the length of the object changes; and
$L_0$ is the original length of the object.

Poisson's ratio (v) is the ratio, when a sample object is stretched, of the contraction or transverse strain (perpendicular to the applied load), to the extension or axial strain (in the direction of the applied load).

$$v = -\frac{\varepsilon_{trans}}{\varepsilon_{axial}} = -\frac{\varepsilon_x}{\varepsilon_y} \qquad \text{Equation 2}$$

Where:
v is the resulting Poisson's ratio,
$\varepsilon_{trans}$ is transverse strain (negative for axial tension, positive for axial compression); and $\epsilon_{axial}$ is axial strain (positive for axial tension, negative for axial compression).

In some embodiments, the present invention provides methods that include a method comprising: providing a selected portion of a subterranean formation that comprises tight gas, a shale, a clay, and/or a coal bed and having a first Young's modulus and a first Poisson's ratio; providing a plasticity modification fluid comprising an embrittlement modification agent; placing the plasticity modification fluid into the subterranean formation so as to treat the portion of the subterranean formation; and embrittling the portion of the treated portion of the formation so that the treated portion has a second Young's modulus after treatment that is higher than the first Young's modulus and a second Poisson's ratio after treatment that is lower than the first Poisson's ratio.

Figures 4, 5:
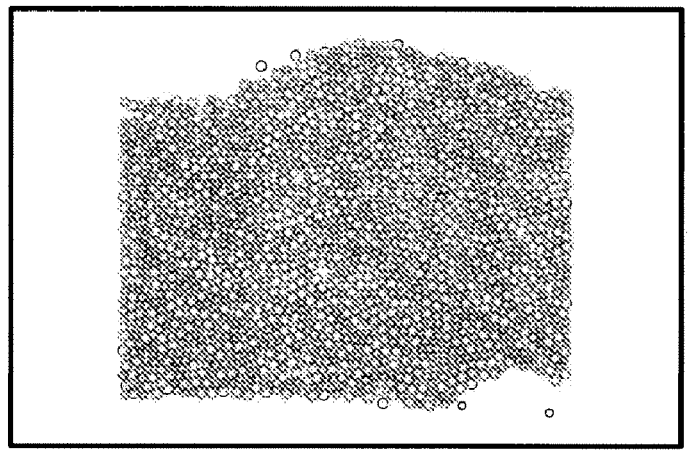
FIG. 4 illustrates a typical stress strain curve.
FIG. 5 illustrates a sample showing plastic deformation in a compression test.

It is believed that ductile materials are materials that can be characterized by a very large region on the stress strain curve where the material can be deformed plastically once its yield stress is exceeded. FIG. 4 shows a typical stress strain curve for a material that behaves in a ductile manner; this curve has two distinct regions, a linear elastic region followed by a plastic region. In the plastic region, the shape of a specimen can be changed significantly without completely failing or breaking. An example of a stress-strain curve and a cylinder that has been plastically failed is shown in FIG. 5.

Figure 7:
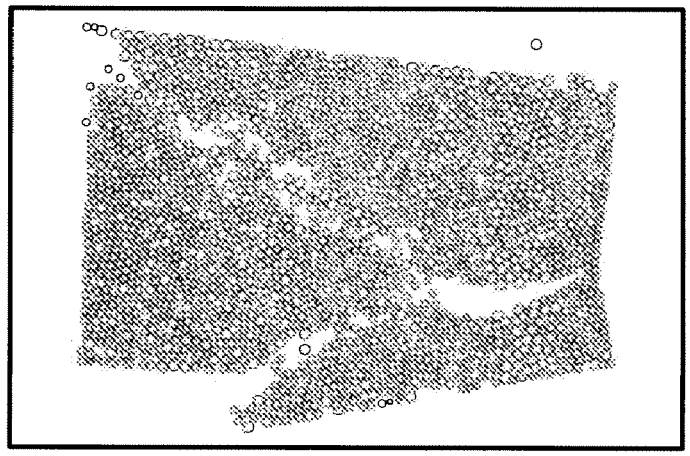
FIG. 7 illustrates a cylinder that has undergone a brittle failure.
Figure 6:
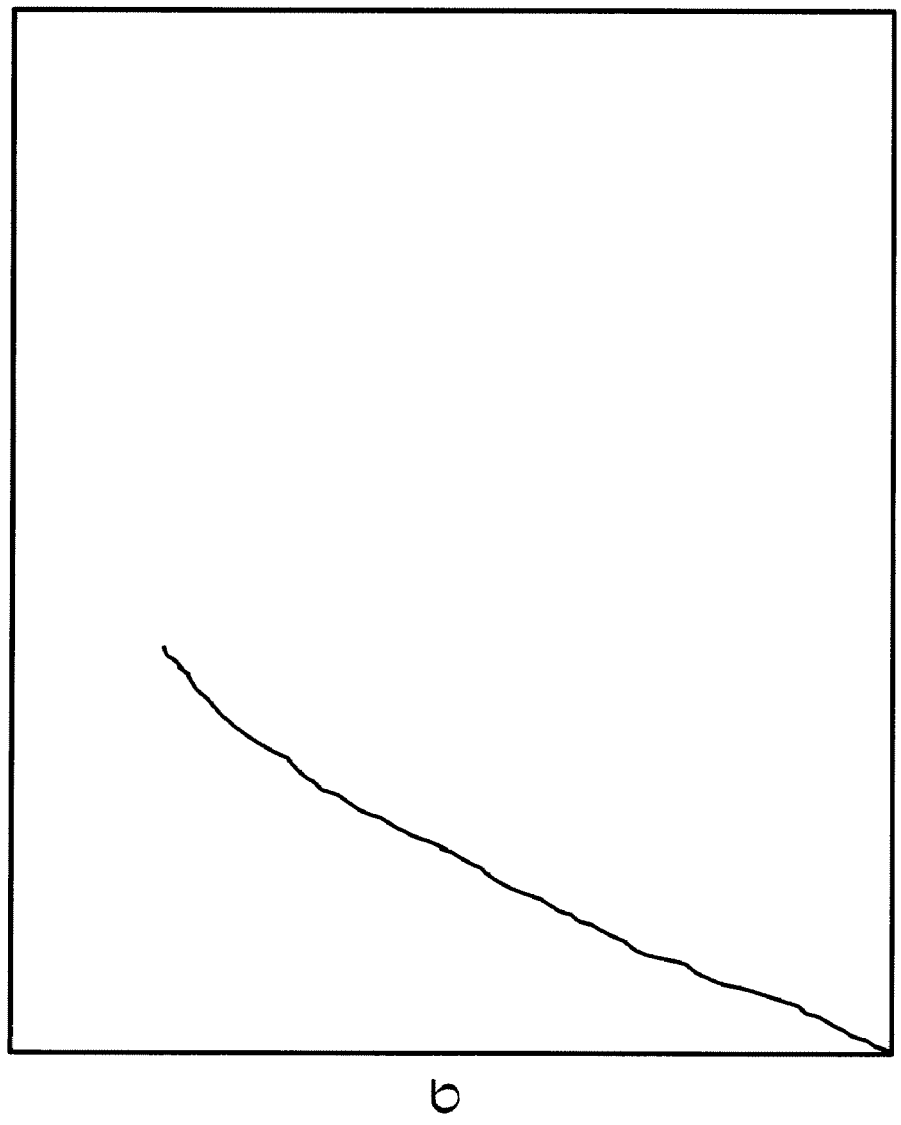
FIG. 6 shows a typical stress strain curve.

It is believed that brittle materials behave very differently and will fail before there is any significant deformation. FIG. 6 shows a typical stress strain curve for a brittle material and FIG. 7 shows a cylinder that has undergone a brittle failure. In this stress-strain curve, there is little or no plastic region.

Figure 8:
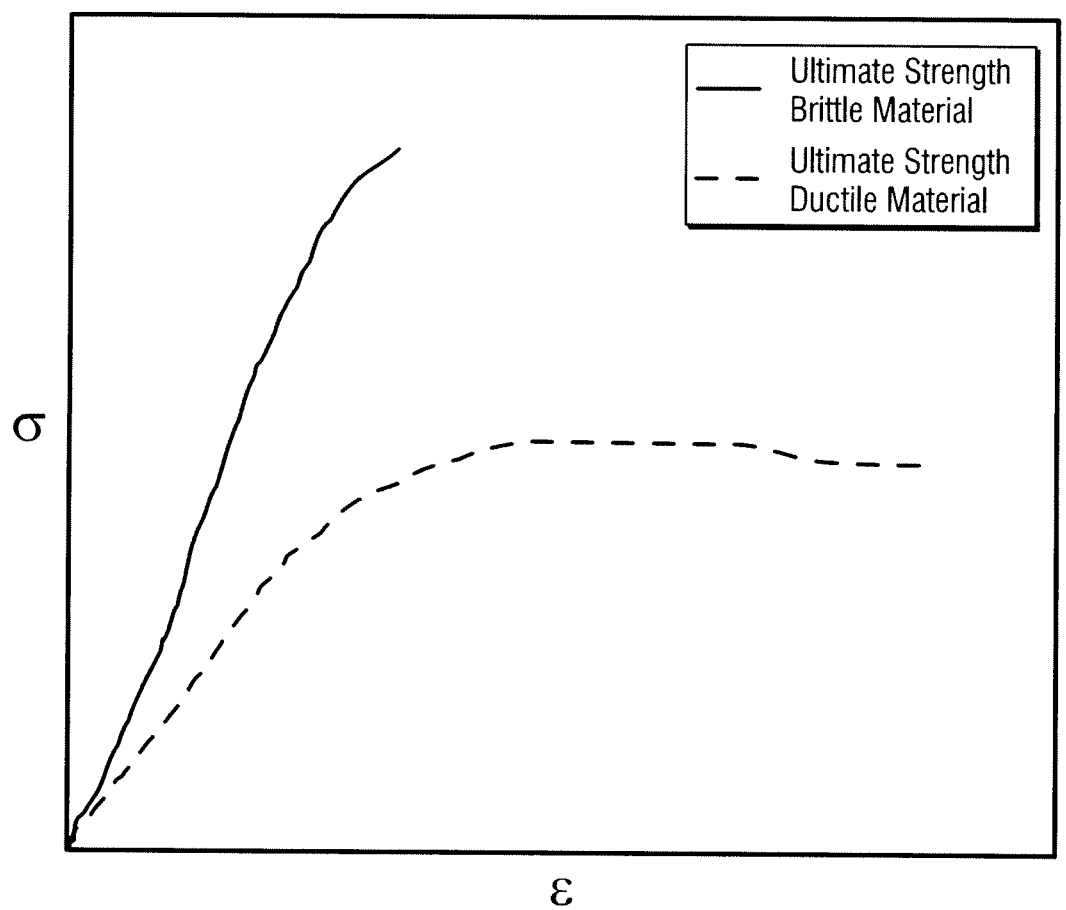
FIG. 8 shows a stress-strain plot showing how a ductile material when transformed to a brittle material will be strengthened as it becomes more brittle.

During the process of embrittlement in ductile subterranean formation such as a shale the formation material is transformed from a ductile material that can be failed plastically under stress to a brittle material that does not deform plastically. This may be due to a favorable ion exchange. To achieve this behavior from a single material, an alteration of the nature of the formation material is advisable. To achieve the brittle behavior, the ultimate strength of the material will have to increase significantly as shown in FIG. 8.

From an embedment stand point, it is evident that when the formation behaves in a ductile manner, once the yield stress is exceeded the formation will plastically fail allowing the proppant grain to be embedded deep into the formation material. In a situation when the formation is brittle, the formation will not plastically deform meaning that there will be no embedment of the proppant into the surface of the formation material. The combination of changing to a brittle material and strengthening the formation allows more stress to be applied without loss of conductivity due to embedment.

In some embodiments, the present invention provides methods that include a method comprising: providing at least one fracture in a subterranean formation that comprises tight gas, a shale, a clay, and/or a coal bed; providing a plasticity modification fluid that comprises an aqueous fluid and an embrittlement modification agent; placing the plasticity modification fluid into the fracture in the subterranean formation; and embrittling at least one fracture face of the fracture to prevent clay extrusion of the formation into the fracture.

The term "plasticity modification fluid" as used herein refers to a fluid that has a high pH at downhole conditions that is capable of altering the mechanical properties of the surrounding rock at the fracture face, which results in a prevention of the extrusion or intrusion of the rock into the proppant pack in the fracture.

The term "fracture face" as used herein refers to a face of a crack or surface of breakage within rock.

The term "clay extrusion" herein refers to the mechanical phenomena of the rock in a subterranean formation surrounding a fracture intruding into the fracture, and thus, discombobulating the fracture face and/or enveloping the proppant in the fracture. This may include the migration or intrusion of clay from the surrounding rock into the fracture.

The term "substantially prevent" as used herein means to prevent to a measurable extent, but not necessarily to completely prevent.

The plasticity modification fluids of the present invention comprise an aqueous fluid and an embrittlement modification agent, and therefore, have a high pH. The pH range of the fluids is preferably 10 or above at downhole conditions.

It is believed that these plasticity modification fluids prevent the rock surrounding a fracture from migrating into the proppant pack or open fracture, which would otherwise plug the fracture. Thus, the plasticity modification fluids are chemical fluids that counteract the mechanical phenomena to prevent the extrusion mechanism (e.g., through embrittling the rock) and the resultant proppant embedment or fracture closure. This is believed to affect the basal spacing in the surrounding clays.

These fluids are also believed to prevent shale sloughing by strengthening shale through embrittlement. Using these plasticity modification fluids provides a means of strengthening exposed shale faces to provide improved long term completion performance, especially in sand control operations in high permeability formations. For example, in high permeability fracturing operations, the goal is to form embrittled shale portions that are in direct contact with the fracture, gravel pack, open hole, or screen so that when it is exposed to draw-down conditions, it will not fail or cause damage to the proppant pack, gravel pack, or screen. This could have significant impact in formations where stand-alone screen completions could replace more expensive gravel pack completions by addressing the shale problems that are the primary cause of failure in stand-alone screen completions.

Suitable aqueous fluids include any aqueous fluid that is compatible with a high pH including fresh water, brines, and the like. The concentration of the aqueous fluid in the plasticity modification fluids of the present invention will depend on the desired pH (e.g., 10 or above at downhole conditions) of the fluid given the factors involved in the treatment.

The embrittlement modification agents for use in the present invention comprise high alkaline materials. Suitable examples include, but are not limited to, lithium hydroxide, sodium hydroxide, potassium hydroxide, rubidium hydroxide, calcium hydroxide, strontium hydroxide, barium hydroxide, cesium hydroxide, sodium carbonate, lime, amines, ammonia, borates, Lewis bases, other strong bases, and any derivative or combination thereof. The concentration of the embrittlement modification agent in the plasticity modification fluids of the present invention will depend on the desired pH (e.g., about 10 or above at downhole conditions) of the fluid given the factors involved in the treatment. The effect of the plasticity modification fluids of the present invention is surprising because past studies have found that utilizing bases, such as sodium hydroxide, to stabilize clays has proven relatively ineffective in that it was believed that they can promote significant formation permeability damage, and in some instances, actually increase the fresh water sensitivity of formation clays.

Optionally, the plasticity modification fluids of the present invention may comprise cationic additives, such as cationic polymers and cationic organic additives, to enhance the plasticity modification. Divalent cationic additives may be more stable. If used, such additives may be used in an amount of about 0.1% to about 1% by weight of the fluid. Hydroxy aluminum and zirconium oxychloride are examples. Other examples include the following additives available from Halliburton Energy Services, Inc. in Duncan, Okla.: "CLAYSTA XP," "CLAYSTA FS," "CLAYFIX-II," and "CLAYFIX-II PLUS." Suitable additives are described in the following patents, each of which are hereby incorporated by reference, U.S. Pat. Nos. 5,097,094, 4,974,678, 4,424,076, and 4,366,071.

Optionally, the plasticity modification fluids of the present invention may comprise salts such as salts of lithium, sodium, potassium, rubidium, calcium, strontium, barium, cesium, sodium, potassium chloride, calcium chloride, magnesium, and manganese. The ion exchange resulting from the presence of the salt is useful in aiding in the shrinkage of the rock.

Optionally, including surfactants in the plasticity modification fluids may facilitate ultra low surface tensions and allow these fluids to penetrate into a matrix or micro fracture more easily.

In some embodiments, the plasticity modification fluid may be placed in a subterranean formation as a result of a fracturing treatment. The process of hydraulic fracturing creates the maximum differential pressure helping to make these fluids penetrate more readily into the formation matrix or micro fractures.

Any suitable fracturing fluid and method for the subterranean formation may be used in conjunction with the present invention. In some embodiments, the methods of the present invention may be very well suited for applications using very inefficient fluids or fluids that have little fluid loss control, such as linear gelled fluids or ungelled fluids such as water. These fluids do not tend to form filter-cakes at the formation surface, and therefore, are capable of leaking off more easily into a tight formation matrix or micro fracture. Crosslinked fluids are also suitable, but because of their improved efficiency and controlled fluid loss, they may not tend to invade as deeply into the formation or micro fractures.

In one aspect, the invention provides a method comprising: fracturing a subterranean formation that comprises tight gas, a shale, a clay, and/or a coal bed to form at least one fracture therein; providing a plasticity modification fluid that comprises an aqueous fluid and an alkaline plasticity modification agent; placing the plasticity modification fluid into the fracture in the subterranean formation; and allowing the plasticity modification fluid to substantially prevent clay extrusion into the fracture In one aspect, the invention provides a method comprising: providing a subterranean formation that comprises tight gas, a shale, a clay, and/or a coal bed; providing a plasticity modification fluid comprising an alkaline plasticity modification agent; placing the plasticity modification fluid into a subterranean formation so as to form a treated portion of the formation; and allowing a portion of the treated portion of the formation to dehydrate to have a retained hardness factor of at least 65% when tested using a Brinell Hardness Test that is current as of the filing date of this application.

In one aspect, the invention provides a sample of a shale rock having a greater than 65% retained hardness when tested using a Brinell Hardness Test (that is current as of the filing date of this application) after treatment with a plasticity modification fluid that comprises an alkaline plasticity modification agent.

In one embodiment, a method of treating a subterranean formation comprises the following steps: placing a treatment fluid into a well bore that penetrates a subterranean formation, wherein the subterranean formation comprises at least one selected from the group consisting of: a shale, a clay, a coal bed, and a combination thereof and applying a pressure pulse to the treatment fluid.

In another embodiment, a method of treating a subterranean formation comprises the following steps: placing a treatment fluid into a well bore that penetrates a subterranean formation, wherein the subterranean formation comprises at least one selected from the group consisting of: a shale, a clay, a coal bed, and a combination thereof; and applying a pressure pulse that exceeds the formation fracture gradient to the treatment fluid.

In one embodiment, the present invention provides a method comprising: providing at least a portion of a subterranean formation that comprises a shale; providing a plasticity modification fluid that comprises an aqueous fluid and an alkaline embrittlement modification agent; placing a pack completion assembly neighboring the portion of the subterranean formation; and embrittling at least a portion of the shale to form an embrittled shale portion.

In one embodiment, the present invention provides a method comprising: providing a subterranean formation that comprises a shale; providing a plasticity modification fluid comprising an embrittlement modification agent; placing the plasticity modification fluid into a subterranean formation so as to form an embrittled shale portion of the formation, wherein the embrittled shale portion has a retained hardness factor of at least 65% when tested using a Modified Brinell Hardness Test.

In one embodiment, the present invention provides a method comprising: providing a selected portion of a subterranean formation that comprises a shale and having a first Young's modulus; providing a plasticity modification fluid comprising an embrittlement modification agent; and placing the plasticity modification fluid into the subterranean formation so as to embrittle the shale to form an embrittled shale portion so that the embrittled shale portion has a second Young's modulus after treatment that is higher than the first Young's modulus.

To facilitate a better understanding of the present invention, the following examples of certain aspects of some embodiments are given. In no way should the following examples be read to limit, or define, the scope of the invention.

EXAMPLES

A modified version of the Brinell Hardness Test (as defined below), referred to herein as a Modified Brinell Hardness Test, can be used to measure the hardness of samples of subterranean formations, in terms of the Brinell Hardness Number ("BHN") relative to each other, or of formation samples before and after certain treatments such as exposure to various fluids. The Brinell Hardness Test, thus, is a measure of the resistance of the rock to indentation, which has direct applicability to proppant embedment problems.

The Brinell Hardness Test method involves indenting the test material with a 10 mm diameter hardened steel or carbide ball subjected to a load of 3000 kg. For softer materials the load can be reduced to 1500 kg or 500 kg to avoid excessive indentation. The full load is normally applied for 10 to 15 seconds in the case of iron and steel and for at least 30 seconds in the case of other metals. The diameter of the indentation left in the test material is measured with a low powered microscope. The BHN is calculated by dividing the load applied by the surface area of the indentation. Formula 3 shows the calculation for the method:

$$BHN = F/[(\Pi/2 \cdot D)(D - (\sqrt{D^2 - D^2_1}))]$$

Figure 9:
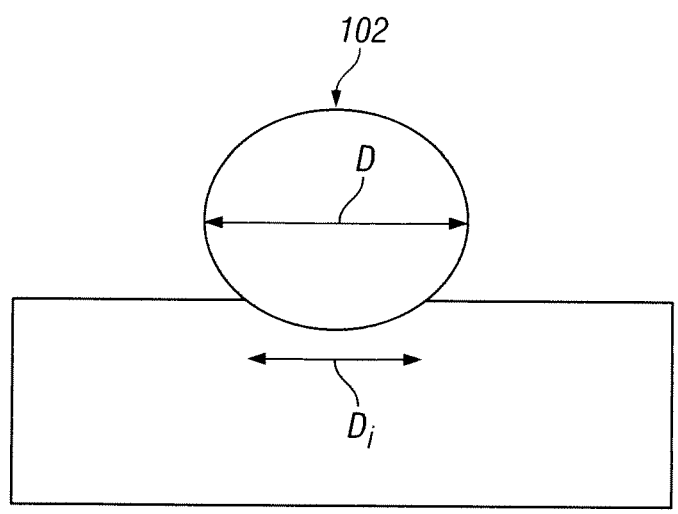
FIG. 9 illustrates the Brinell Hardness Test.

The diameter of the impression is the average of two readings at right angles. The use of a Brinell hardness number table can simplify the determination of the Brinell hardness. A well structured BHN reveals the test conditions, and looks like this, "75 HB 10/500/30" which means that a Brinell Hardness of 75 was obtained using a 10 mm diameter hardened steel with a 500 kilogram load applied for a period of 30 seconds. On tests of extremely hard metals a tungsten carbide ball is substituted for the steel ball. Compared to the other hardness test methods, the Brinell ball makes the deepest and widest indentation, so the test averages the hardness over a wider amount of material, which will more accurately account for multiple grain structures and any irregularities in the uniformity of the material. This method is the best for achieving the bulk or macro-hardness of a material, particularly those materials with heterogeneous structures. FIG. 9 illustrates the test, where 102 is the applied force.

For the following series of Quantitative BHN tests, the BHN was determined for samples of shale from the Haynesville and Woodford formations both dry and after exposure to various fluids. The data is given in Table 1 showing the BHN values for before and after exposure to the indicated fluids. The % retained hardness was calculated by dividing the post-exposure BHN by the pre-exposure BHN and multiplying that value by 100. The sample that was exposed to the HYBOR G fluid retained approximately 50% more of its initial "hardness" when compared to samples that were exposed to the other two fluids. "HYBOR G" is a delayed borate crosslinked guar fracturing fluid available from Halliburton Energy Services, Inc. in Duncan, Okla. "FR-56" is a friction reducer available from Halliburton Energy Services, Inc. in Duncan, Okla. It is a liquid friction reducer that comprises an oil-water emulsion that is easily inverted or broken and dispersed with aqueous fluids. "DELTA 200" is a borate fracturing fluid available from Halliburton Energy Services, Inc. in Duncan, Okla., and is designed for use in wells having a bottomhole temperature of up to about 200° F.

TABLE 1

| Formation | Fluid | BHN (pre-) | BHN (post-) | % Retained Hardness |
|---|---|---|---|---|
| Haynesville | HYBOR G | 8.4 | 7.625 | 91 |
| Haynesville | Slickwater with a FR-56 friction reducer | 8.9 | 5.4 | 61 |
| Woodford | DELTA 200 (with no crosslinker) | 23 | 14 | 61 |

A possible explanation for the effects seen in Table 1 can be seen if one looks at the pH of the various fluids. HYBOR G has a pH of 10.5, and the Slickwater and DELTA 200 fluids have pHs of about 7. It is possible that the more alkaline solution, coupled with divalent cations present in the formation mineralogy, served to give similar effects as lime strengthening of substrates. The effect of this hardening or reduction in hardening in a formation can best be visualized by looking at proppant embedment in soft formations.

For these qualitative Quad-Cell embedment tests, the Quad-Cell load frame may be used to evaluate proppant embedment and changes in the formation/proppant mineralogy after exposure to closure pressures and temperature similar to well conditions. Briefly, the experiment involves loading a wafer of shale of about a 2" diameter into the cell, placing proppant (slurried with the desired fluid) on top of the first wafer, and installing a second shale wafer on top. In effect, this replicates a shale fracture propped by a proppant and exposed to a treatment fluid. Closure stress is applied and the cell is heated to the desired temperature and held at these conditions for 2-4 weeks. After this time period, the sample is removed from the cell, impregnated with an epoxy, and thin sections are taken.

Figure 10A:
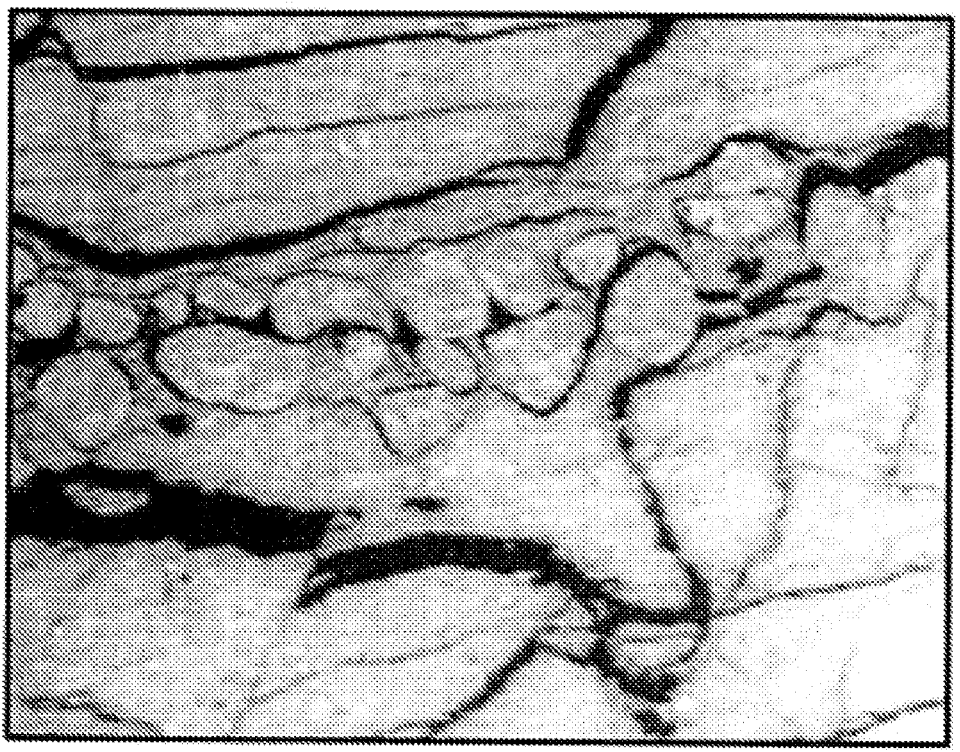
FIGS. 10 A and 10 B illustrate proppant embedment.
Figure 10B:
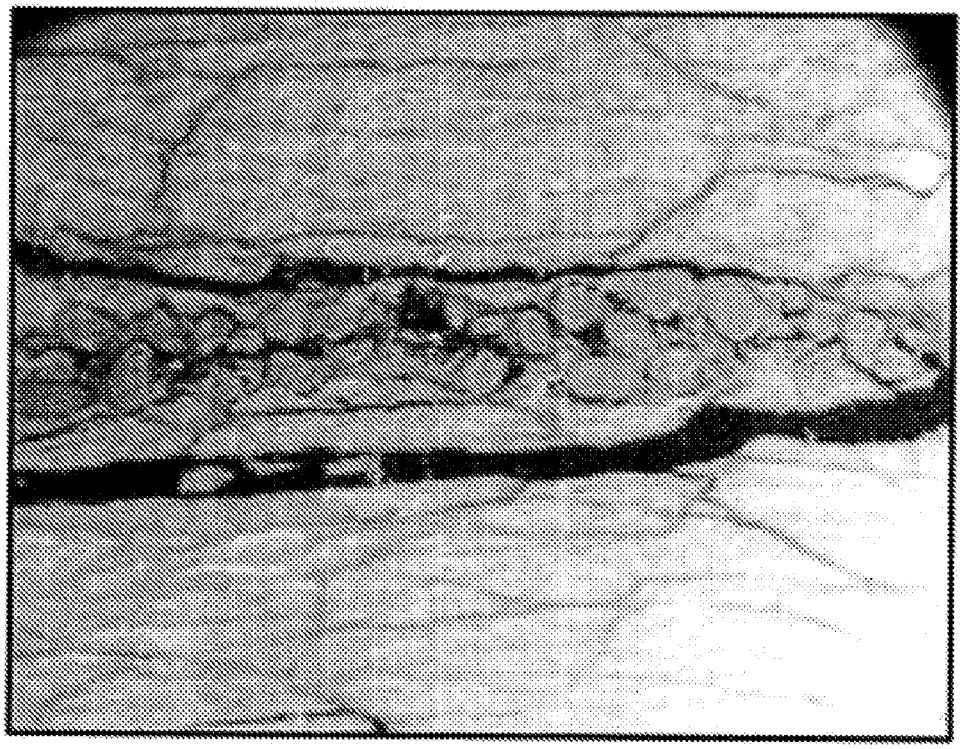

FIGS. 10A and 10B are scanning electron microscope ("SEM") photos of thin sections take from a sample of the Woodford shale in which 0.5#/ft$^2$ of proppant has been placed with a 16/30 CRC slick water treatment comprising FR-56. The pack was placed in a load frame and approximately 7.5K psi closure pressure was applied at 200° F. for a period of 3 weeks. As can be seen in the thin sections, the proppant has in most cases been enveloped within the formation.

Figure 11A:
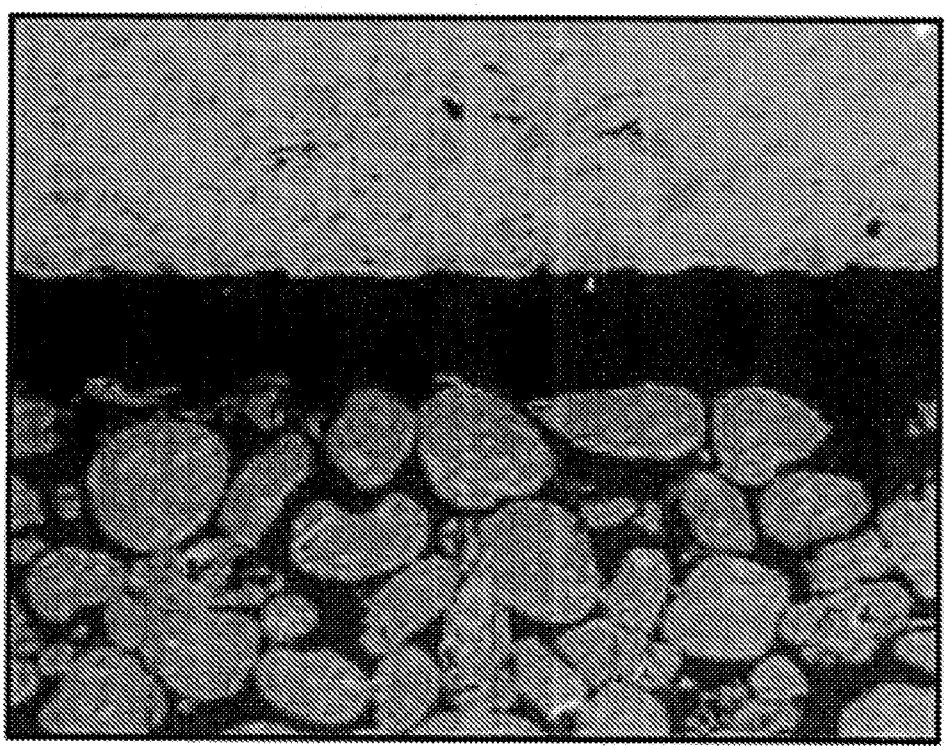
FIGS. 11 A and 11 B illustrate proppant embedment.
Figure 11B:
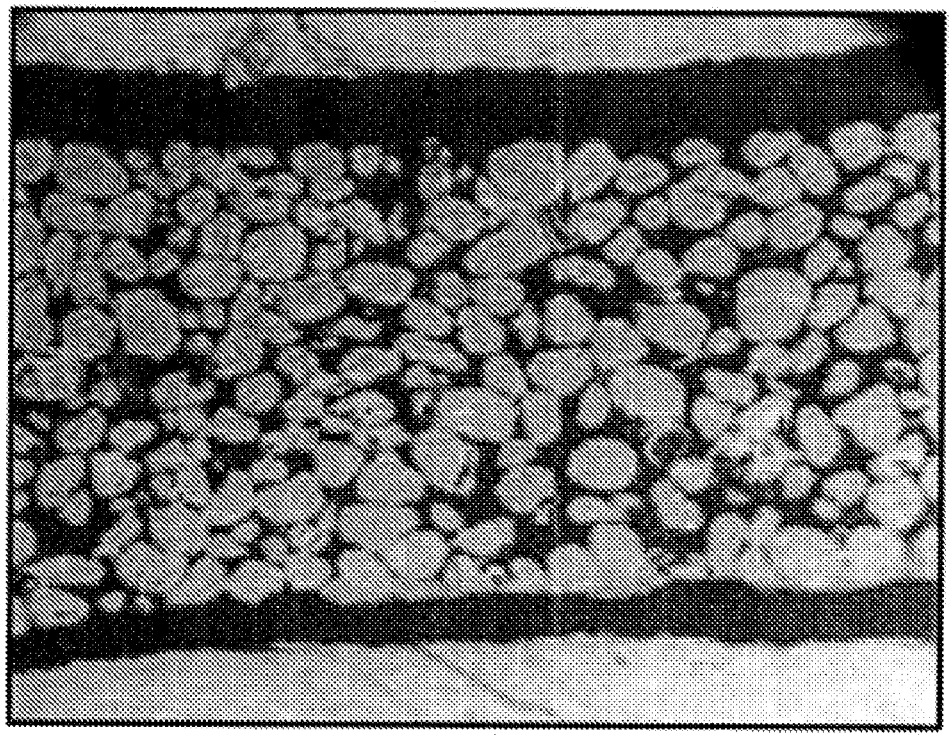
Figure 13:
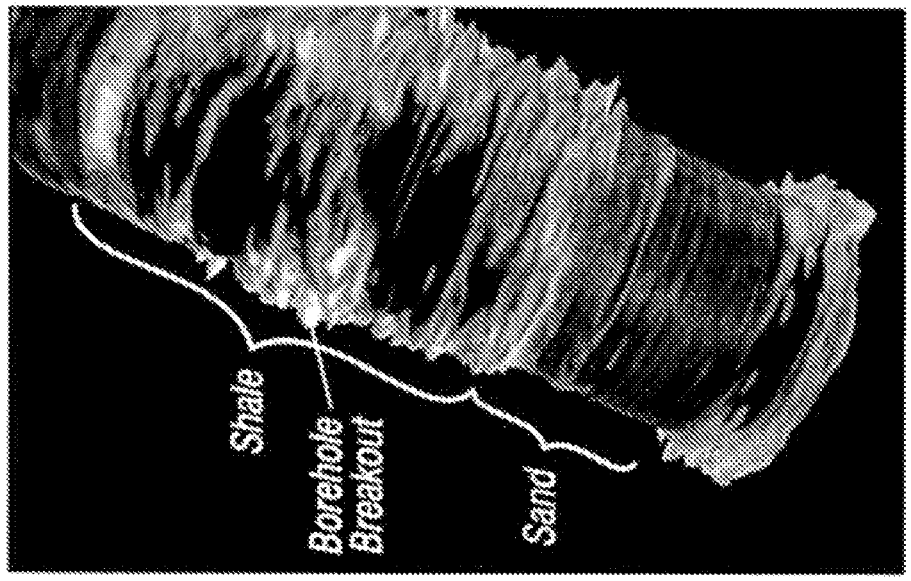
FIG. 13 illustrates image logs taken in a well where borehole breakout occurred in a shale section.
Figure 12:
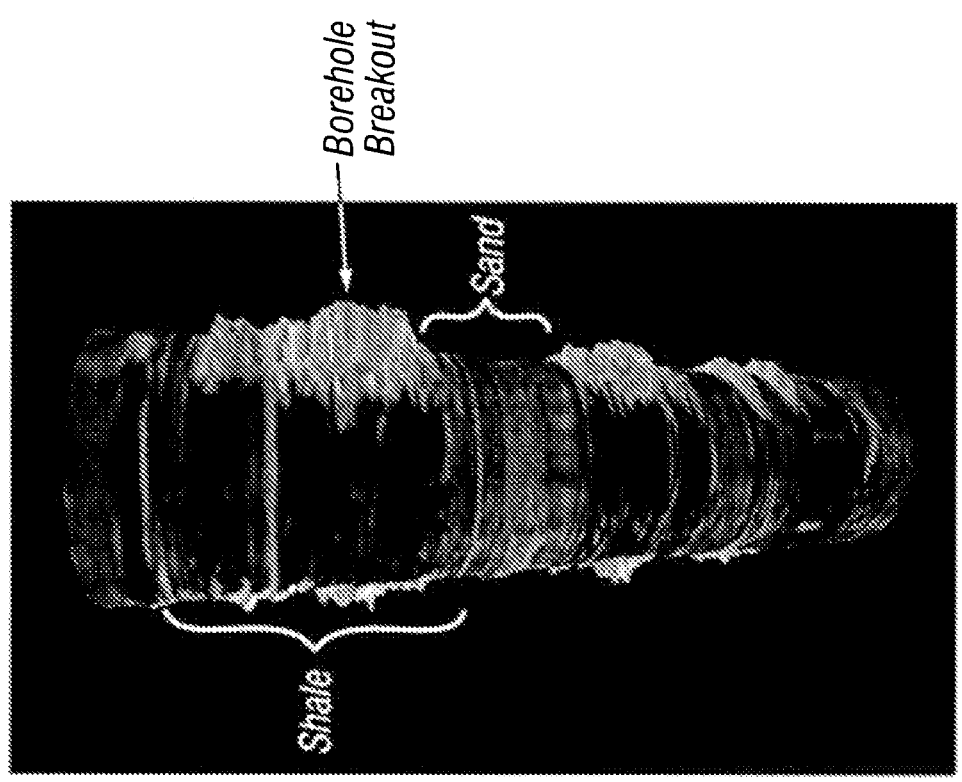
FIG. 12 illustrates image logs taken in a well where borehole breakout occurred in a shale section.
Figure 15:
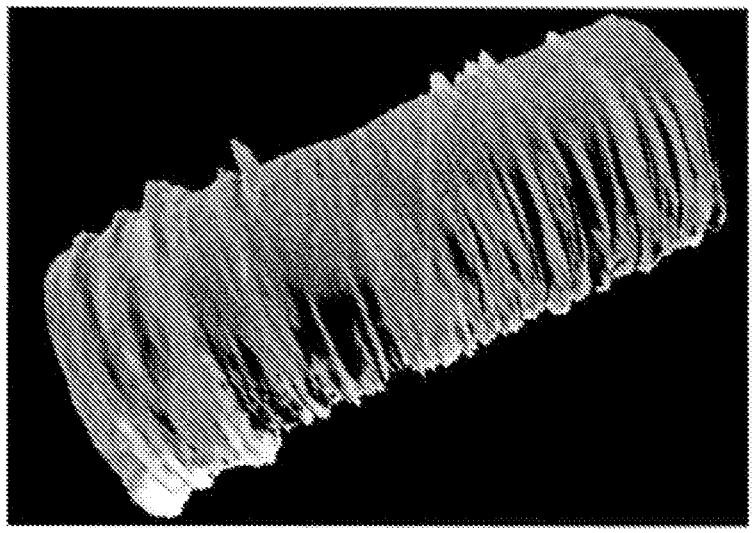
FIG. 15 illustrates image logs taken in a well where borehole breakout occurred in a shale section.
Figure 14:
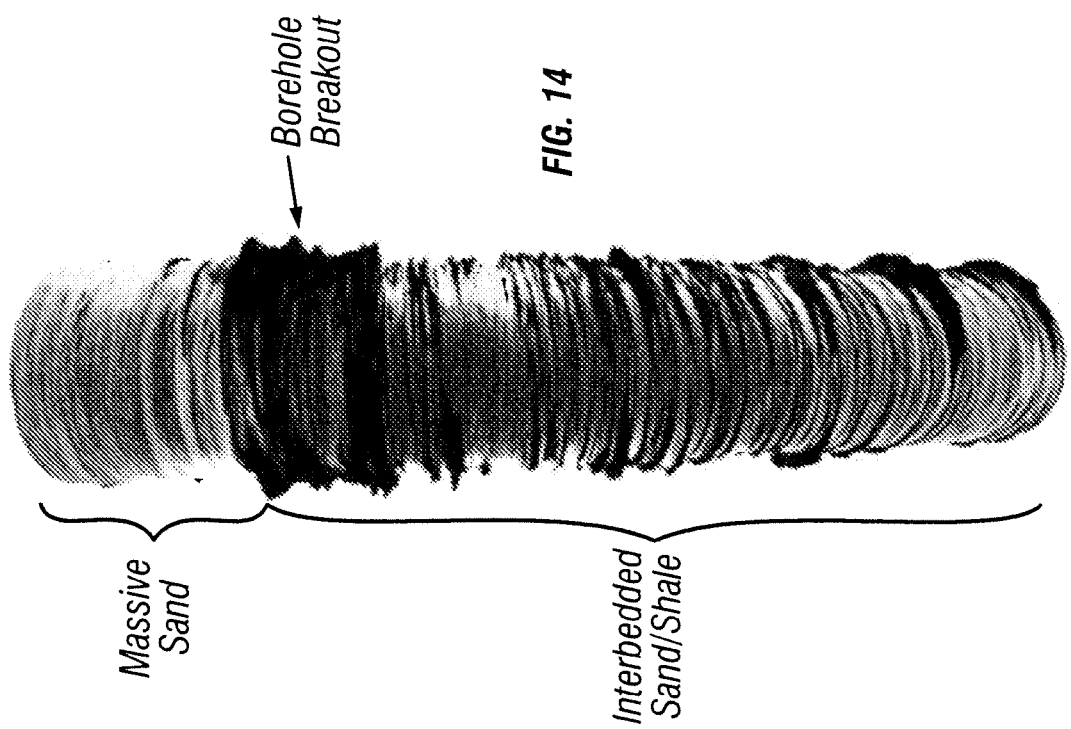
FIG. 14 illustrates image logs taken in a well where borehole breakout occurred in a shale section.
Figure 17:
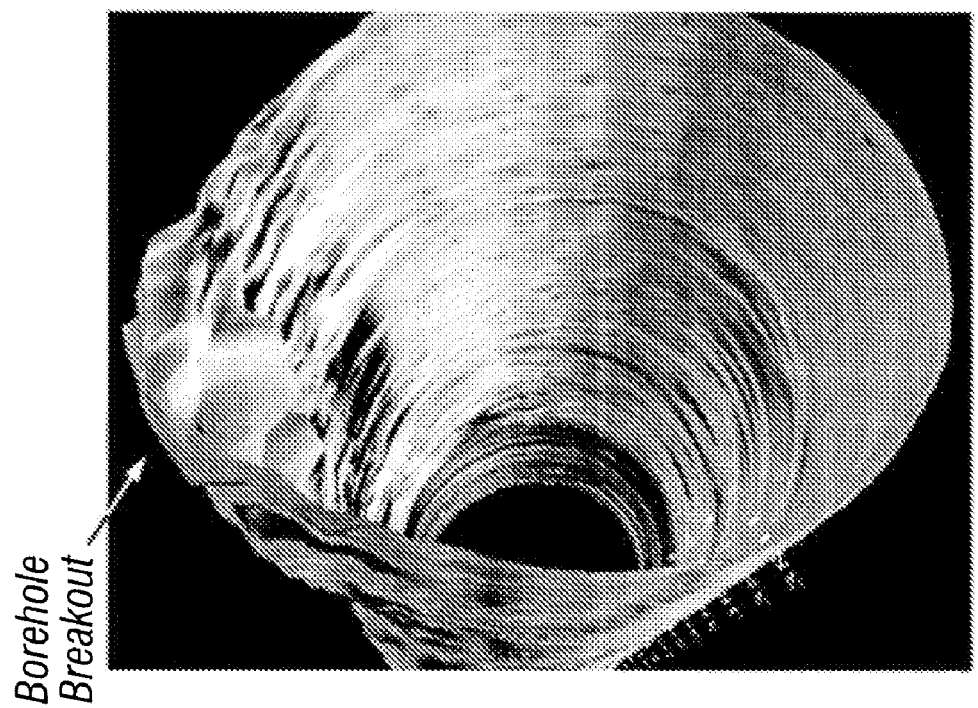
FIG. 17 illustrates image logs taken in a well where borehole breakout occurred in a shale section.
Figure 16:
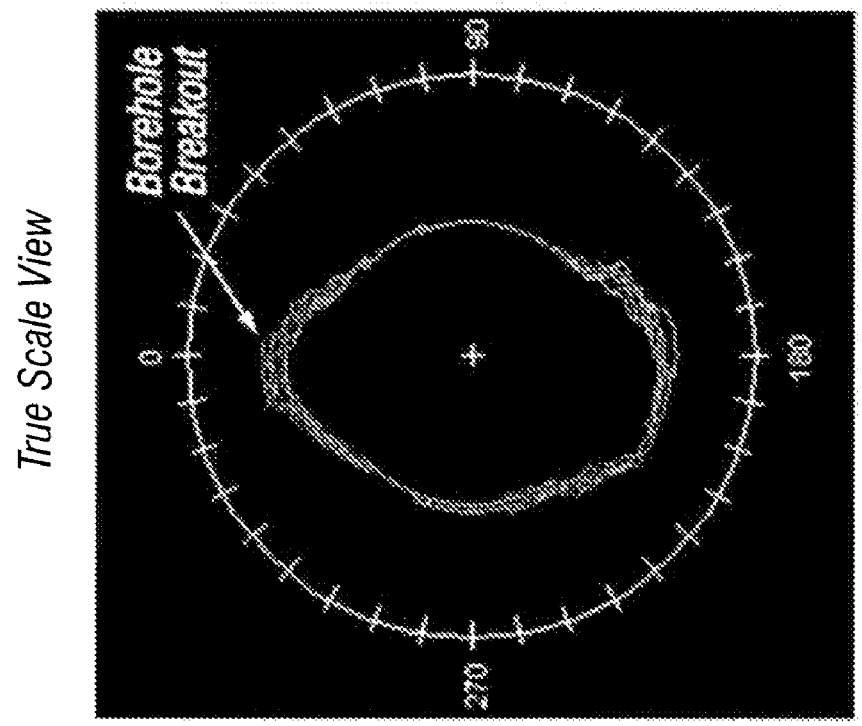
FIG. 16 illustrates a true scale view of a borehole breakout in a well bore.

FIGS. 11A and 11B are also SEM photos of thin sections from a sample of Woodford shale, but now 2#/ft$^2$ of proppant is used with a HYBOR G fluid. Closure stress and temperature are the same as in the first test. Here there is little to no embedment of the proppant into the formation. Again, one explanation can be found in the differences in pH of the two treating fluids. In this sample of Woodford shale, there is both calcium and magnesium present.

These tests indicate that it is possible that a high pH treating fluid can minimize proppant embedment and fracture closure by modifying the surface of the fracture such that it increases or maintains its relative hardness after exposure to treating fluids.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method comprising:
   providing at least a portion of a subterranean formation that comprises a shale;

providing a plasticity modification fluid that comprises an aqueous fluid and an alkaline embrittlement modification agent;

placing a pack completion assembly neighboring the portion of the subterranean formation; and embrittling at least a portion of the shale to form an embrittled shale portion.

2. The method of claim 1 wherein the embrittled shale portion has less sloughing potential than the portion of the subterranean before the embrittling step.

3. The method of claim 1 wherein embrittled shale portion substantially prevents formation intrusion into the fracture.

4. The method of claim 1 wherein the embrittlement modification agent comprises a base chosen from the group consisting of: an amine; lithium hydroxide; sodium hydroxide; potassium hydroxide; rubidium hydroxide; calcium hydroxide; strontium hydroxide; barium hydroxide; sodium carbonate; lime; and any derivative or combination thereof.

5. The method of claim 1 wherein the plasticity modification fluid comprises a cationic additive.

6. The method of claim 1 wherein the subterranean formation comprises laminated sands portion and/or a layered sand/shale sequence.

7. A method comprising:

providing a subterranean formation that comprises a shale;

providing a plasticity modification fluid comprising an embrittlement modification agent;

placing the plasticity modification fluid into a subterranean formation so as to form an embrittled shale portion of the formation, wherein the embrittled shale portion has a retained hardness factor of at least 65% when tested using a Modified Brinell Hardness Test.

8. The method of claim 7 wherein the subterranean formation comprises at least one pack completion neighboring the embrittled shale portion.

9. The method of claim 8 wherein the pack completion comprises a gravel pack.

10. The method of claim 7 wherein the subterranean formation is high permeability.

11. The method of claim 7 wherein the embrittlement modification agent comprises a base chosen from the group consisting of: lithium hydroxide; sodium hydroxide; potassium hydroxide; rubidium hydroxide; calcium hydroxide; strontium hydroxide; barium hydroxide; sodium carbonate; lime, other strong bases, and any derivative or combination thereof.

12. The method of claim 7 wherein the plasticity modification fluid comprises a cationic additive.

13. The method of claim 7 wherein the plasticity modification fluid comprises a salt and/or a surfactant.

14. The method of claim 7 wherein the subterranean formation comprises an open-hole.

15. The method of claim 7 wherein the subterranean formation comprises laminated sands portion and/or a layered sand/shale sequence.

16. A method comprising:

providing a selected portion of a subterranean formation that comprises a shale and having a first Young's modulus;

providing a plasticity modification fluid comprising an embrittlement modification agent; and placing the plasticity modification fluid into the subterranean formation so as to embrittle the shale to form an embrittled shale portion so that the embrittled shale portion has a second Young's modulus after treatment that is higher than the first Young's modulus.

17. The method of claim 16 wherein the subterranean formation comprises at least one pack completion neighboring the embrittled shale portion.

18. The method of claim 16 wherein the embrittled shale portion has a first Poisson's ratio.

19. The method of claim 16 wherein the embrittled shale portion has a second Poisson's ratio after treatment that is lower than the first Poisson's ratio.

20. The method of claim 16 wherein the subterranean formation comprises a stand-alone screen completion.

* * * * *